Figure 1:
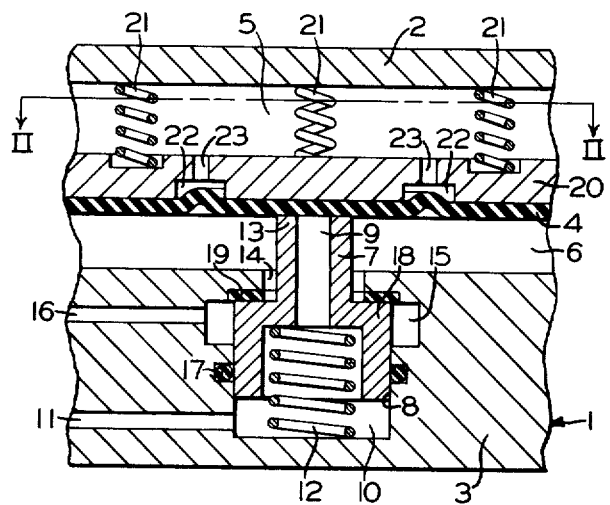

United States Patent [19]

Deschenes

[11] 3,904,175
[45] Sept. 9, 1975

[54] ARRANGEMENT OF RESILIENT DIAPHRAGM ACTING AS A VALVE SEAT AND SEPARATING ADJACENT PRESSURE CHAMBERS

[75] Inventor: Roger Deschenes, Montfermeil, France

[73] Assignee: WABCO Westinghouse, Freinville-Sevran, France

[22] Filed: June 28, 1974

[21] Appl. No.: 484,155

[52] U.S. Cl. .......... 251/331; 137/627.5; 137/116.3; 137/116.5
[51] Int. Cl. ............................................. F16k 7/17
[58] Field of Search ........ 251/61.1, 331; 137/627.5, 137/116.3, 116.5

[56] References Cited
UNITED STATES PATENTS
3,319,926  5/1967  Boger.......................... 251/331 X FOREIGN PATENTS OR APPLICATIONS
797,078  6/1958  United Kingdom............. 137/116.5

Primary Examiner—Robert G. Nilson
Attorney, Agent, or Firm—R. W. McIntire, Jr.

[57] ABSTRACT

A novel arrangement of a resilient diaphragm in a valve device wherein said diaphragm serves to separate two adjacent pressure chambers and also acts as a valve seat, said arrangement being structured to subject the diaphragm to radial stresses as well as axial stresses for keeping the diaphragm wrinkle free in the area acting as a valve seat.

7 Claims, 4 Drawing Figures

ARRANGEMENT OF RESILIENT DIAPHRAGM ACTING AS A VALVE SEAT AND SEPARATING ADJACENT PRESSURE CHAMBERS

BACKGROUND OF THE INVENTION

Some of the presently known valve devices employ resilient diaphragms made of a rubber material, for example, for separating adjacent pressure chambers. The diaphragm itself, therefore, is subjected to the fluid pressures prevailing in the respective pressure chambers for effecting the desired movement of the diaphragm which, in turn, may impart movement to valve members and also serve as the seat for the valve member. It is important that the area of the diaphragm serving as the valve seat present an absolutely flat surface to insure complete sealing effect when the valve member is seated thereon.

In valve devices of the type above discussed, after a period of usage, the diaphragm may become permanently deformed, that is, wrinkled or corrugated due to aging of the rubber and repeated alternate application and relief of stresses thereon, so that in time the seating surface of the diaphragm loses its sealing effect relative to the valve member because such seating surface may no longer be uniformly flat.

SUMMARY OF THE INVENTION

The object of the invention therefore is to provide an arrangement for a diaphragm used not only for separating pressure chambers but also as valve seats for valve members operated by the diaphragm, whereby the valve seating area of the diaphragm is caused to assume a flat distended disposition during such time that the valve member is seated thereon, notwithstanding that the rubber has taken on a permanent wrinkled or corrugated form.

Briefly the invention comprises a follower plate conforming in diameter and movable with the diaphragm, said backing plate being placed against the diaphragm on the side adjacent a low pressure chamber normally charged with fluid at a lower pressure than that in a high pressure chamber on the opposite side of the diaphragm. The backing plate is provided with a recess, preferably an annular recess such as a groove or channel surrounding the valve seating area of the diaphragm, so that when the side of the diaphragm, on which the seating area is situated, is subjected to higher pressure in the high pressure chamber, that portion of the diaphragm extending over the annular channel is distended or stretched into said channel to cause said seating portion of the diaphragm to be stretched into a smooth flat surface on which the valve member may seat.

Figure 2:
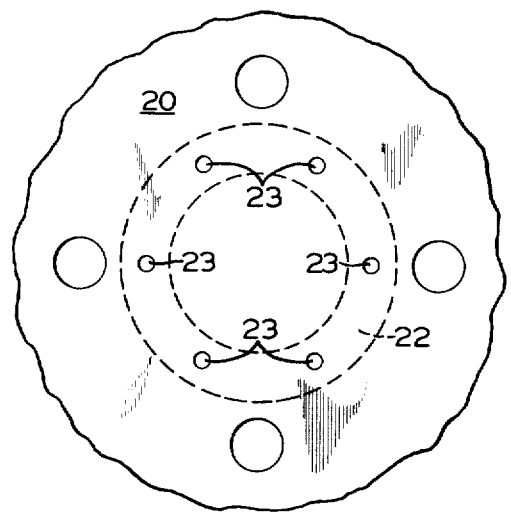
Figure 3:
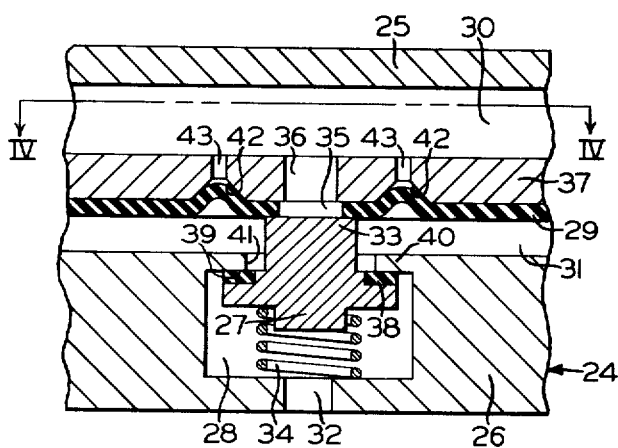
Figure 4:
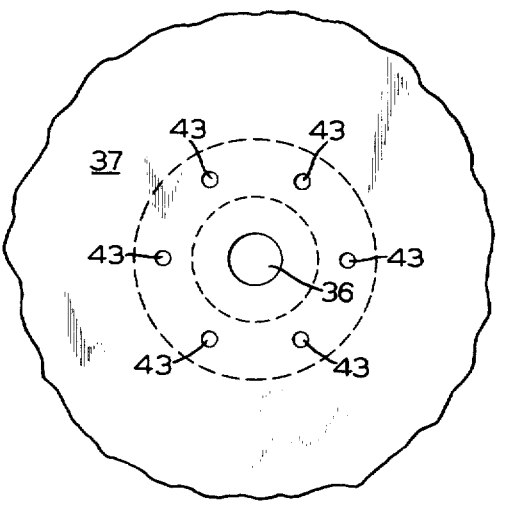

In the drawing, FIG. 1 is a fragmentary, elevational view, in section, of a valve device embodying the invention; FIG. 2 is a fragmentary sectional view taken on line II—II of FIG. 1 as viewed in the direction indicated by the arrows; FIG. 3 is a fragmentary, elevational view, in section, of a valve device embodying a modification of the invention; and FIG. 4 is a fragmentary sectional view taken on line IV—IV of FIG. 3 as viewed in the direction indicated by the arrows.

DESCRIPTION AND OPERATION

As shown in FIG. 1, a valve device designated generally by the reference numeral 1 and embodying the invention, comprises an upper casing section 2 and a lower casing section 3 between which the outer periphery (not shown) of a diaphragm member 4 is sealingly clamped so as to separate a low pressure or atmospheric chamber 5 adjacent the upper side of the diaphragm from a high pressure or delivery chamber 6 adjacent the lower side of the diaphragm and connected to a fluid pressure operable device (not shown) to be controlled by fluid pressure delivered thereto by the valve device.

A supply-exhaust valve member 7 is vertically operably disposed in a stepped bore 8 formed in lower casing section 3, said supply-exhaust valve member having a coaxial exhaust passageway 9 extending therethrough to an exhaust chamber 10 formed at the bottom of said bore, said exhaust chamber being connected to atmosphere via an atmospheric passageway 11 formed in said lower casing section.

A spring 12 is compressedly disposed in exhaust chamber 10 between supply-exhaust valve member 7 and the bottom of said exhaust chamber for urging said supply-exhaust valve member upwardly, as viewed in FIG. 1. The upper end of supply-exhaust valve member 7 comprises an exhaust valve 13 having a seating area or valve seat thereon which spring 12 urges into contact with and into a seated position on the underside of diaphragm 4. With exhaust valve 13 in a seated position, delivery chamber 6 is cut off from exhaust passageway 9.

Supply-exhaust valve member 7 comprises an upper smaller diameter exhaust valve portion, on which exhaust valve 13 is formed, and a lower larger diameter supply valve portion in which spring 12 is disposed. The smaller diameter portion of supply-exhaust valve member 7 extends coaxially through a restricted portion of stepped bore 8 with an ample clearance 14 therebetween for flow of fluid pressure from an annular fluid pressure supply chamber 15 surrounding the larger diameter portion of said supply-exhaust valve member and chargeable with fluid pressure via a supply passageway 16 formed in casing section 3. Leakage of fluid pressure from supply chamber 14 to exhaust chamber 10 is prevented by an O-ring 17 disposed in a groove formed in lower casing section 3 in surrounding relation to the larger diameter portion of supply-exhaust valve member 7.

The external shoulder forming the junction of smaller diameter portion of supply-exhaust valve member 7 with the larger diameter portion thereof comprises a supply valve 18 which cooperates with a valve seat 19 surrounding the lower end of clearance 14 to control communication between supply chamber 15 and delivery chamber 6.

According to the invention, a follower plate 20 is disposed against the upper side of diaphragm 4 and movable therewith. A plurality of springs 21 of relatively light compression are compressed in atmospheric chamber 5 between the upper wall of casing section 2 and follower plate 20 for acting through said plate and urging diaphragm 4 into a seated position relative to exhaust valve 13.

Follower plate 20 has an annular channel or groove 22 of rectangular cross section formed therein on the lower side adjacent diaphragm 4 in concentric surrounding relation to supply-exhaust valve member 7, the portion of the diaphragm surrounded by said channel being greater in diameter than the diameter of exhaust valve 13. Channel 22 is provided with a plurality of openings 23 angularly spaced therein for connecting said channel to atmospheric chamber 5. Although six openings 23 are shown, the number of such openings may be more or less, as needed.

In considering the operation of valve device 1 and, particularly, the function of diaphragm 4 relative thereto, let it be assumed that supply chamber 15 is charged with fluid at a pressure corresponding to that at the source (not shown), that delivery chamber 6 is charged with fluid at the pressure required by the fluid pressure operable device (not shown) connected thereto, and that supply-exhaust valve member 7 is in a lap position in which it is shown and in which all forces acting on opposite sides of diaphragm 4 are balanced.

With the forces acting on the opposite sides of diaphragm 4 being balanced, the effect of fluid pressure in delivery chamber 6, along with the additional light effect of spring 12 acting on the lower side of said diaphragm, balances the effect of springs and atmosphere acting on the upper side of said diaphragm. But, since the pressure in delivery chamber 6 acting on the portion of diaphragm 4 extending over the space provided by channel 22, is greater than the atmospheric pressure prevailing in atmospheric chamber 5, said portion of the diaphragm is forced and distorted into said channel by the greater pressure prevailing in the delivery chamber. By being forced into the recess of channel 22, diaphragm 4 is subjected to lateral radial stresses which cause the diaphragm, even one having wrinkles and corrugations formed therein and especially that portion thereof encircled by channel 22, to be drawn taut and stretched into a flat even shape that provides a flat surface on which exhaust valve 13 may seat and effectively seal.

Diaphragm 4 and follower 20 may also be subjected, in addition to the forces of spring 12 and pressure in delivery chamber 6, to an upwardly directed force exerted thereon by such means as an operating piston (not shown) controlled by the device (not shown) connected to said delivery chamber for effecting a reduction of fluid pressure in said delivery chamber in a manner and for a purpose not deemed essential to an understanding of the invention. With diaphragm 4 and follower plate 20 subjected to the additional upward force, said diaphragm is lifted off exhaust valve 13 (because seated supply valve 18 prevents supply-exhaust valve member 7 from following) to an unseated position in which fluid pressure in delivery chamber 6 may be exhausted until such pressure is reduced and a state of equilibrium is again reached. Supply-exhaust valve member 7 being of the self-lapping type, operates in a well known manner in maintaining the pressure of fluid in delivery chamber 6 at the desired level.

FIG. 3 illustrates a modified valve device 24 comprising an upper casing section 25 and a lower casing section 26 in which a self-lapping type supply-exhaust valve member 27 is operably disposed in a coaxial recess or fluid pressure supply chamber 28 formed in said lower casing section. Unlike supply-exhaust valve member 7 of valve device 1, exhaust-valve member 27 of valve device 24 is a solid member.

A diaphragm member 29 has its outer periphery (not shown) sealingly clamped between the outer extremities of casing sections 25 and 26 for separating a low pressure or atmospheric chamber 30 adjacent the upper side of the diaphragm from a high pressure or delivery chamber 31 adjacent the lower side of the diaphragm. Delivery chamber 31 is connectable to a fluid pressure operable device (not shown) that is controlled by fluid pressure delivered thereto by the valve device. Supply chamber 28 is chargeable with fluid pressure via a port 32 connectable to a source of fluid under pressure (not shown).

The upper end of supply-exhaust valve member 27 comprises an exhaust valve 33 which is urged into a seated position on diaphragm 29 by a spring 34 compressedly disposed in supply chamber 28. Instead of providing an exhaust course through the supply-exhaust valve member 27, as in supply-exhaust valve member 7 in FIG. 1, relief or exhaust of fluid pressure from delivery chamber 13, when exhaust valve 33 is unseated from diaphragm 29, is accomplished via an aperture 35 formed in diaphragm 29, an axially aligned aperture 36 formed in a follower plate 37 disposed against the upper side of said diaphragm, and atmospheric chamber 30.

Supply-exhaust valve member 27 is also provided with a supply valve 38 which cooperates with a valve seat 39 comprising the inner peripheral surface on the underside of an annular flange 40 forming an opening 41 of smaller diameter than recess 28 via which said recess or supply chamber may be communicated with delivery chamber 31 when said supply valve is unseated from said valve seat.

With the exception of the course via which fluid pressure is exhausted from delivery chamber 31, the supply-exhaust valve member 27 operates similarly to supply-exhaust valve member 7 of FIG. 1 and as hereinbefore described. It is not deemed essential, therefore, to repeat such description of operation in connection with supply-exhaust valve 27 shown in valve device 24 of FIG. 2. Although not shown in FIG. 2, a plurality of springs similar to springs 21 provided in valve device 1 shown in FIG. 1, are normally disposed and function in a similar manner in atmospheric chamber 30 of valve device 24 shown in FIG. 2.

According to the invention, follower plate 37 in valve device 24 also has formed therein, on the side adjacent diaphragm 29, an annular channel or groove 42 of an inverted V-shaped cross section, said channel being concentric to apertures 35 and 36 and surrounding the portion of said diaphragm which includes the seating area for exhaust valve 33. A plurality of openings 43 are angularly spaced in channel 42 for opening said channel to atmospheric chamber 30.

When subjected to the higher pressure in delivery chamber 31, as compared to atmospheric pressure in atmospheric chamber 30, diaphragm 29 is affected in similar manner as diaphragm 4 in valve device 1, that is, said diaphragm 29 is subjected to lateral or radial stresses and tension so as to be drawn taut and thereby smooth out any wrinkles or corrugations that may have formed therein after a certain period of usage. Exhaust valve 33, therefore, is presented with a smooth, flat surface on which to seat.

Having now described the invention, what I claim as new and desire to secure by Letters Patent, is:

1. In a valve device comprising a first casing section having a first pressure chamber and secured to a second casing section having a second pressue chamber therein, said second pressure chamber being normally charged at a pressure higher than said first pressure chamber, the combination of:

a. a diaphragm member sealingly secured at its outer periphery between said first and second casing sections for separating said first pressure chamber from said second pressure chamber;

b. a valve member operably disposed in said second chamber and having a valve seat thereon, said valve member normally being biased toward a seated position in which said valve seat is seated on one side of said diaphragm member adjacent said second chamber; and c. a follower plate biased against the opposite side of said diaphragm member for movement therewith and having a recess formed therein on the side adjacent said opposite side of the diaphragm, the portion of said diaphragm extending over said recess being distortedly forced thereinto by the higher pressure in said second chamber for causing the remainder of the diaphragm to be drawn taut and flat for insuring sealing contact of said valve seat thereon.

2. The combination, as set forth in claim 1, wherein said recess is an annular channel of greater diameter than said valve seat and disposed in surrounding relation to that portion of said diaphragm contacted by the valve seat when seated thereon.

3. The combination, as set forth in claim 2, wherein said valve member is provided with a coaxial passageway extending therethrough and via which fluid pressure may be relieved from said second chamber when said valve member occupies an unseated position relative to the diaphragm member.

4. The combination, as set forth in claim 2, wherein said diaphragm member and said follower plate are provided with axially aligned apertures in concentric relation to said annular channel and via which fluid pressure may be relieved from said second chamber to said first chamber when said valve member occupies an unseated position relative to the diaphragm member.

5. The combination, as set forth in claim 2, wherein said channel is provided with a plurality of angularly spaced openings for communicating the channel with said first chamber and the lesser pressure therein.

6. The combination, as set forth in claim 5, wherein said annular channel is of rectangular cross section.

7. The combination, as set forth in claim 5, wherein said annular channel is of an inverted V-shaped cross section.

* * * * *